(12) United States Patent
Foley

(10) Patent No.: US 9,552,145 B2
(45) Date of Patent: Jan. 24, 2017

(54) SYSTEM AND METHOD FOR PLANNING TASKS BASED ON A GRAPHICAL REPRESENTATION OF TIME

(71) Applicant: Michael Victor Rodney Foley, Bangalore (IN)

(72) Inventor: Michael Victor Rodney Foley, Bangalore (IN)

(*) Notice: Subject to any disclaimer, the term of this patent is extended or adjusted under 35 U.S.C. 154(b) by 310 days.

(21) Appl. No.: 14/011,415

(22) Filed: Aug. 27, 2013

(65) Prior Publication Data

US 2015/0067564 A1 Mar. 5, 2015

(51) Int. Cl.
*G06F 3/0484* (2013.01)
*G06Q 10/10* (2012.01)
*G06F 3/0488* (2013.01)
G06F 17/30 (2006.01)
G06F 9/54 (2006.01)

(52) U.S. Cl.
CPC ....... *G06F 3/04842* (2013.01); *G06F 3/04883* (2013.01); *G06Q 10/109* (2013.01); *G06F 9/54* (2013.01); *G06F 17/30551* (2013.01); *G06F 2203/04806* (2013.01)

(58) Field of Classification Search
CPC .. G06F 9/54; G06F 17/30551; G06F 3/04842; G06F 2203/04806; G06F 3/0488
See application file for complete search history.

(56) References Cited

U.S. PATENT DOCUMENTS

| 5,500,938 | A | 3/1996 | Cahill et al. |
| 8,072,457 | B2 | 12/2011 | Schorr et al. |
| 2002/0126121 | A1* | 9/2002 | Robbins ............... G06T 11/206 345/440 |
| 2008/0165255 | A1* | 7/2008 | Christie ............. G06F 3/04883 348/207.99 |
| 2008/0209546 | A1* | 8/2008 | Kim ...................... G06F 3/0482 726/19 |
| 2011/0004835 | A1* | 1/2011 | Yanchar ............... G06Q 10/109 715/763 |
| 2011/0078622 | A1 | 3/2011 | Missig et al. |
| 2011/0167382 | A1* | 7/2011 | van Os ................ G06Q 10/109 715/800 |
| 2011/0202866 | A1* | 8/2011 | Huang .................. G06F 3/0482 715/779 |
| 2011/0283188 | A1 | 11/2011 | Farrenkopf et al. |

(Continued)

*Primary Examiner* — Sherrod Keaton

(74) *Attorney, Agent, or Firm* — The Law Office of Austin Bonderer, PC; Austin Bonderer

(57) ABSTRACT

A method for planning a task based on a graphical representation of time is provided. The method includes (i) displaying at a display unit a first graphical representation of time at a first magnification level, (ii) processing a first input including a gesture on the first graphical representation of time, and (iii) displaying, at the display unit, a second graphical representation of time of a different shape at a second magnification level based on the gesture, (iv) processing a second input including a gesture on the second graphical representation of time to select a third duration from the second graphical representation of time, (v) processing a third input including content associated with the task, and (vi) generating the task associated with the third duration. The first graphical representation of time represents a first duration, and the second graphical representation of time represents a second duration.

10 Claims, 13 Drawing Sheets

(56) References Cited

U.S. PATENT DOCUMENTS

2011/0307598 A1* 12/2011 Orr ................... G06Q 10/109
                                                709/224
2012/0079408 A1*  3/2012 Rohwer ............... G06Q 10/06
                                                715/772
2012/0092267 A1   4/2012 Haug
2014/0149913 A1*  5/2014 Gauthier ........... H04M 1/72566
                                                715/772

* cited by examiner

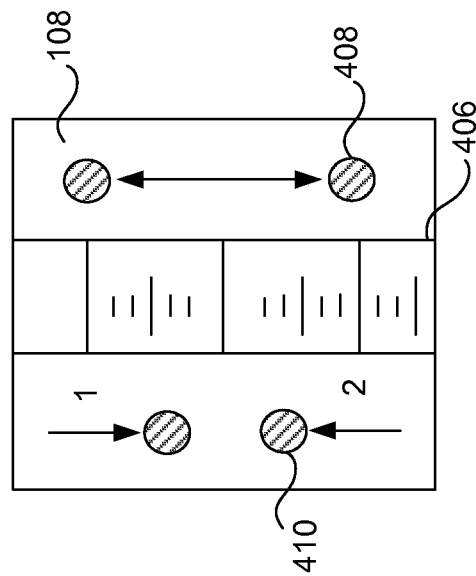
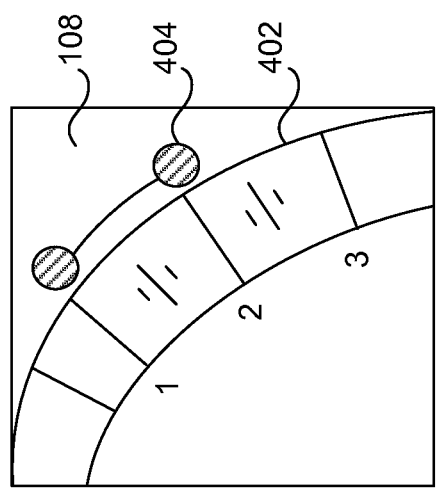

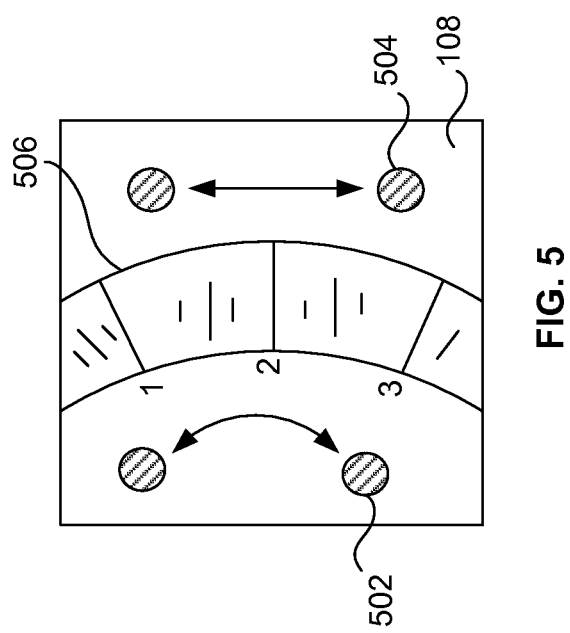

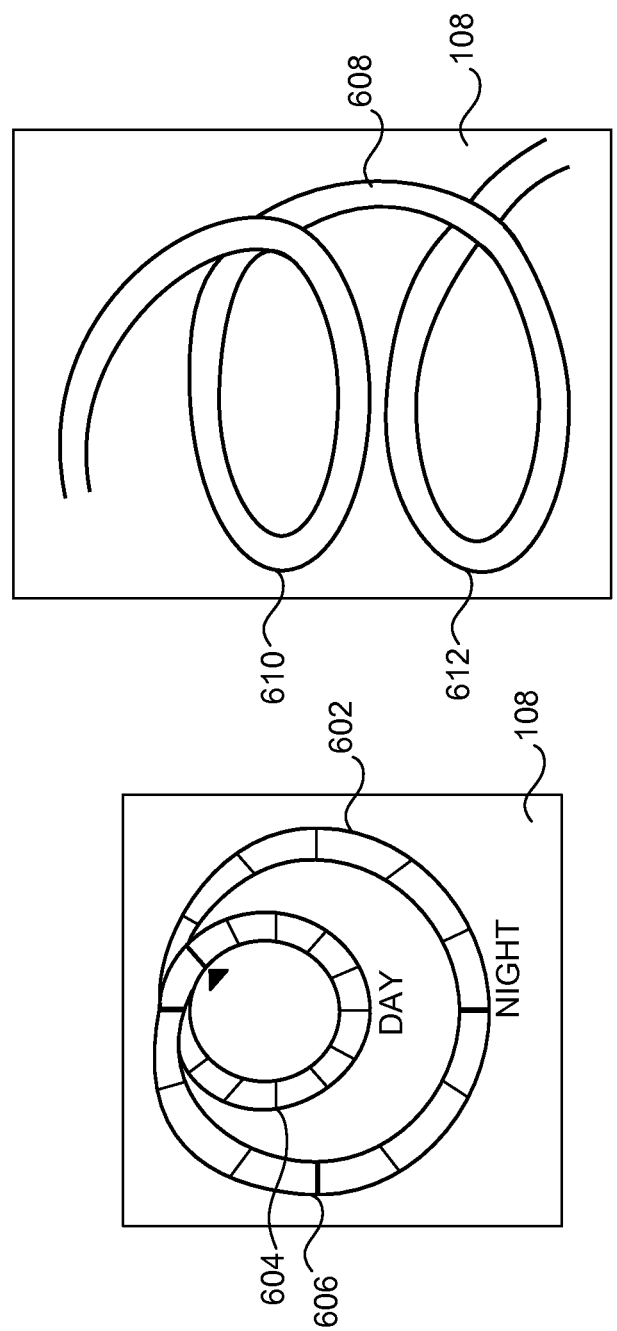

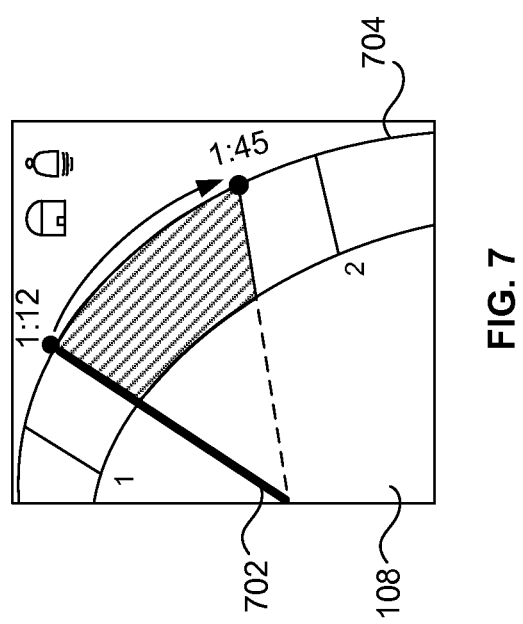

SYSTEM AND METHOD FOR PLANNING TASKS BASED ON A GRAPHICAL REPRESENTATION OF TIME

BACKGROUND

Technical Field

The embodiments herein generally relate to a system and method for planning tasks in a less time and in an intuitive manner, and more particularly to a system and method for planning tasks based on a graphical representation of time.

Description of the Related Art

Planning and organizing tasks helps users to achieve their goals. Typically, there are applications that allow the users to plan tasks and facilitate note-taking and setting reminders. In these applications, the user has to provide a lot of input data. For instance, when the user intends to plan a task (e.g., meeting), the user has to provide input data such as the time the meeting starts, the time the meeting ends, the people to meet, the location of the meeting, etc. Hence, the user may find it difficult and inefficient to plan tasks that can be completed in few minutes or seconds (known as microtasks), since planning itself takes a time which is more or less equal to completion of the tasks. Hence, the user may not think off planning small tasks at all.

Further, the user may find it tedious to provide the information for planning, since he/she has to type that information. Also, typical applications treat planning of macro-tasks (e.g., that require hours for completion) and micro-tasks at a same level. An approach associated with planning macro-tasks may not be suited for micro-tasks. Existing applications are not user friendly, because the user has to still provide a lot of information for planning a task with such applications. Accordingly there remains a need for a tool that can assist the user in planning, note-taking, and setting reminders irrespective of task size without having to spend much time.

SUMMARY OF THE INVENTION

In view of a foregoing, the embodiment herein provides a method for planning a task based on a graphical representation of time is provided. The method includes (i) displaying at a display unit a first graphical representation of time at a first magnification level, (ii) processing a first input including a gesture on the first graphical representation of time, (iii) displaying, at the display unit, a second graphical representation of time of a different shape at a higher magnification level based on the gesture, (iv) processing a second input including a gesture on the second graphical representation of time to select a third duration from the second graphical representation of time, (v) processing a third input including content associated with the task, and (vi) generating the task associated with the third duration. The first graphical representation of time represents a first duration, and the second graphical representation of time represents a second duration.

A shape of the first graphical representation of time may be selected from the group including of: i) a circle, ii) a curve, iii) a spiral, iv) a square and v) a rectangle. A shape of the second graphical representation of time may be selected from the group including of (i) a line, and (ii) a curve. The first input including the gesture may be a reverse-pinch gesture for magnifying the first graphical representation of time that represents the first duration to the second graphical representation of time of the different shape that represents the second duration. The second duration may be a subset of the first duration, and the third duration may be a subset of the second duration.

The method may further include (i) processing a fourth input including an indication to select a time associated with the task from the second graphical representation of time, and (ii) generating a reminder for the task at the time. A gesture that includes rotating a handle bar may be processed to block time associated with the first graphical representation of time and the second graphical representation of time for a task. The method may further include planning a repeating tasks for a duration including processing a gesture on a graphical representation of time that includes a table, and blocking a time for the duration for the repeating task based on the gesture on the graphical representation of time that includes the table. The graphical representation of time that includes the table may be stretched or compressed based on the gesture. Content that includes the second graphical representation of time may be communicated to a secondary display device.

In another aspect, a system for planning a task based on a graphical representation of time. The system includes (a) a memory unit that stores (i) a set of modules and (ii) a database, (b) a display unit that displays (i) a first graphical representation of time at a first magnification level, and (c) a processor that executes a set of modules. The first graphical representation of time represents a first duration. The set of modules include (i) a graphical representation modification module, executed by the processor, processes a first input including a gesture on the first graphical representation of time to obtain a second graphical representation of time of a different shape at a second magnification level. The graphical representation modification module includes (a) a magnification modification module, executed by the processor, that alters the first magnification level of the first graphical representation of time to the second magnification level, and (b) a geometry modification module, executed by the processor, that alters a shape of the first graphical representation of time to obtain the second graphical representation of time of the different shape. The set of modules further include (ii) a duration selection module, executed by the processor, that processes a gesture on the second graphical representation of time and selects a third duration based on the gesture on the second graphical representation of time, and (iii) a task generation module, executed by the processor, that processes a third input including content to generate the task associated with the third duration.

The first input including the gesture may be a reverse-pinch gesture for magnifying the first graphical representation of time that represents the first duration to the second graphical representation of time of the different shape that represents the second duration. The second duration may be a subset of the first duration, and the third duration may be a subset of the second duration. The first input including the gesture may be a pinch gesture for compressing the first graphical representation of time that represents the first duration to the second graphical representation of time of the different shape that represents the second duration. The first duration may be a subset of the second duration. A reminder generation module, executed by the processor, that may (i) process a fourth input including an indication to select a time associated with the task from the second graphical representation of time, and (ii) generates a reminder for the task at the time.

The duration selection module, executed by the processor, may further (i) process a gesture on a graphical representation of time that includes a table, and (ii) blocks a time for a duration for a repeating task based on the gesture on the graphical representation of time that includes the table. The graphical representation of time that includes the table may be stretched or compressed based on the gesture. A communication module, executed by the processor that communicates content that includes the second graphical representation of time to a secondary display device.

In yet another aspect, a method for planning a task based on a graphical representation of time is provided. The method includes (i) displaying at a display unit a first graphical representation of time at a first magnification level, (ii) processing a first input including a gesture on the first graphical representation of time, (iii) displaying, at the display unit, a second graphical representation of time of a different shape at a second magnification level based on the gesture, (iv) processing a second input including a gesture on the second graphical representation of time to select a third duration from the second graphical representation of time, (v) processing a third input including content associated with the task, and (vi) generating the task associated with the third duration. The first graphical representation of time represents a first duration, and the second graphical representation of time represents a second duration. The first duration is a subset of the second duration.

A shape of the first graphical representation of time may be selected from the group including of: (i) a line, and (ii) a curve. A shape of the second graphical representation of time may be selected from the group including of i) a circle, ii) a curve, iii) a spiral, iv) a square and v) a rectangle. The first input including the gesture may be a pinch gesture for compressing the first graphical representation of time that represents the first duration to the second graphical representation of time of the different shape that represents the second duration. The method may further include (i) processing a fourth input including an indication to select a time associated with the task from the second graphical representation of time, and (ii) generating a reminder for the task at the time.

The method may further include planning a repeating tasks for a duration including processing a gesture on a graphical representation of time that includes a table, and blocking a time for the duration for the repeating task based on the gesture on the graphical representation of time that includes the table. The graphical representation of time that includes the table may be stretched or compressed based on the gesture. Content that includes the second graphical representation of time may be communicated to a secondary display device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

With reference to FIG. 3A.

With reference to the FIG. 3A and the FIG. 3B, FIG. 4A is an arc-shaped graphical representation of time, displayed at the interface, which is obtained by processing a gesture on the semi-circle graphical representation of time using the graphical representation modification module of FIG. 2 according to one embodiment of the present disclosure.

With reference to FIG. 3A, FIG. 3B, and FIG. 4A, FIG. 4B illustrates a flat graphical representation of time, displayed at the interface, which is obtained by processing a gesture on the arc-shaped graphical representation of time using the graphical representation modification module of FIG. 2 according to one embodiment of the present disclosure.

FIG. 5 illustrates gestures for manipulating time associated with a graphical representation of time which is displayed at the display interface of FIG. 1 according to one embodiment of the present disclosure.

FIG. 6A illustrates an example graphical representation of time (a circular representation of time) depicting a whole day, displayed at the display interface of the user system of FIG. 1, according to one embodiment of the present disclosure.

FIG. 6B illustrates another example graphical representation of time (a spiral representation of time) depicting a whole day, displayed at the display interface of the user system of FIG. 1, according to one embodiment of the present disclosure.

FIG. 7 illustrates blocking a duration associated with a graphical representation of time for a task using a handle bar which is displayed at the display interface of FIG. 1 according to one embodiment of the present disclosure.

DETAILED DESCRIPTION OF PREFERRED EMBODIMENTS

Figure 1:
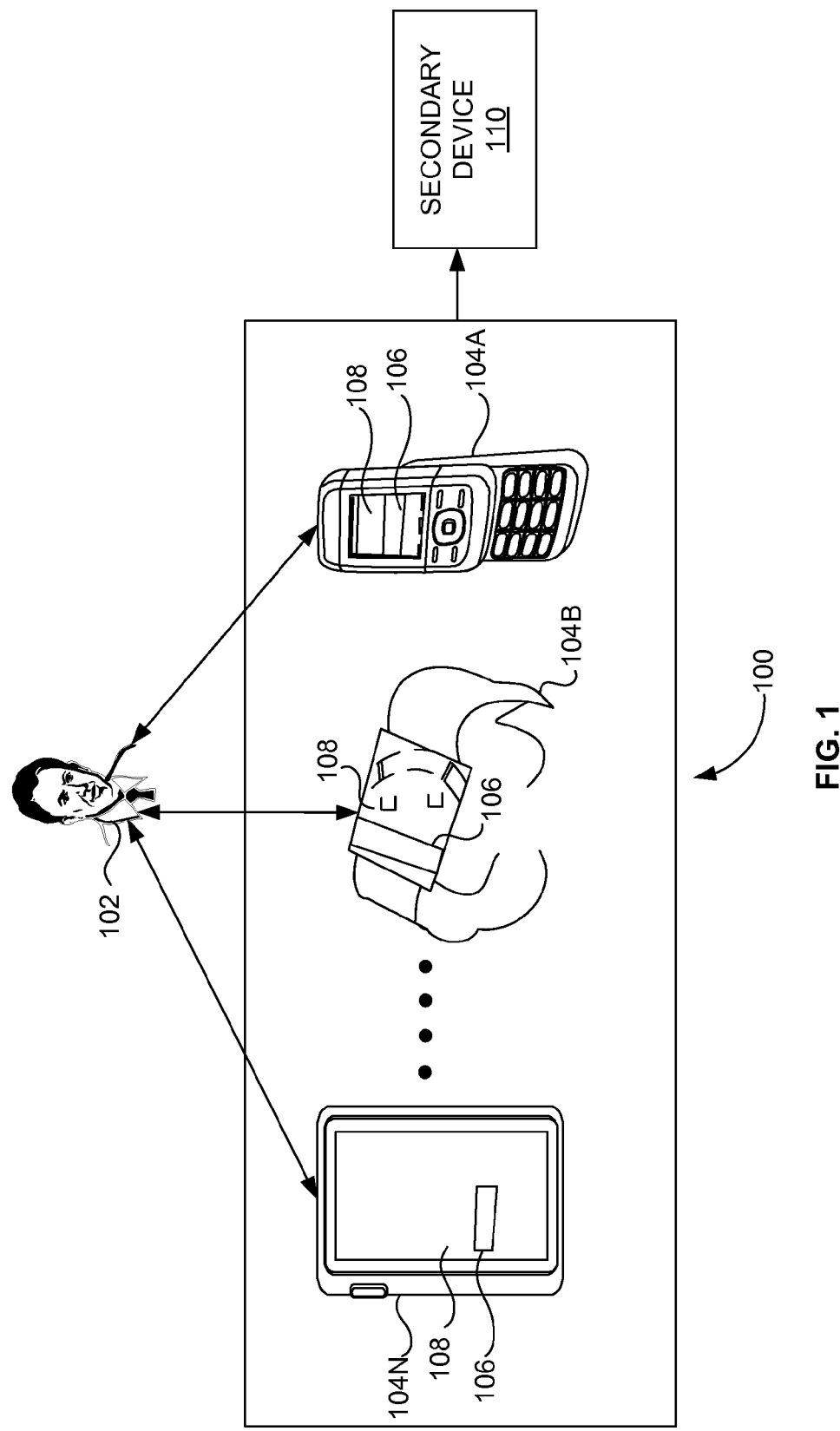
FIG. 1 illustrates a system view of a user communicating with a user system which includes a task planning tool for planning tasks based on a graphical representation of time according to one embodiment of the present disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a tool that can assist a user in planning, note-taking, and setting reminders irrespective of task size without having to spend much time. Embodiments herein achieve this by providing a task planning tool that allows the user to plan one or more tasks based on a graphical representation of time. The user can manipulate time associated with the graphical representation of time, and varies a magnification level and a geometry associated with the graphical representation of time. Referring now to the drawings, and more particularly to FIGS. 1 through 13, where similar reference characters denote corresponding features consistently throughout the figures, there are shown preferred embodiments.

FIG. 1 illustrates a system view 100 of a user 102 communicating with a user system 104A-N which includes a task planning tool 106 for planning tasks based on a graphical representation of time according to one embodiment of the present disclosure. The user system 104A-N may be a smart device such as a smart phone 104A, a smart watch 104B, and a tablet 104N, etc. In one embodiment, the user system 104A-N includes a display interface 108 that can recognize user input's such as a gesture, a stylus input, and/or a digital pen (e.g., a pen-like input device). The task planning tool 106 provides various graphical representation of time (e.g., a cyclic representation, a table representation, and/or a spiral representation) at the display interface 108 of the user system 104A-N based on the user input. The user 102 can plan tasks to be executed using such graphical representation of time.

The task planning tool 106 processes an input (e.g., a gesture) on a graphical representation of time which is displayed at the display interface 108 and manipulates a magnification level of the graphical representation of time. A micro-fragments of time or a macro-fragments of time associated with a duration of the graphical representation of time is displayed at the display interface 108. The micro-fragments of time include a subset of duration associated with the duration of the graphical representation of time. For example, when a graphical representation of time depicts a duration 12 PM to 12 AM, then a micro-fragments of time may include a subset of duration (e.g., 12 PM to 12.01 PM, 12 PM to 1 PM, or 7 PM to 10 PM) associated with the duration of the graphical representation of time.

Similarly, the macro-fragments of time include an anticipatory duration associated with the duration of the graphical representation of time. For example, for the graphical representation of time depicting the duration 12 PM to 12 AM, the macro-fragments of time may include an anticipatory duration (e.g., 12 PM to 1 AM, 12 PM to 12 PM which is a day, a week, or a month) associated with the duration of the graphical representation of time.

In one embodiment, a magnification level associated with a duration of a graphical representation of time is manipulated by a) stretching, b) compressing, c) expanding, and/or d) fragmenting time on the graphical representation of time based on a gesture from the user 102. Stretching time may display a micro-fragments of time associated with the graphical representation of time. Compressing time may display a macro-fragments of time associated with the graphical representation of time. Expanding time associated with planning multiple tasks that can be completed in a short time (e.g., in few seconds, or in few minutes). Fragmenting time associated with breaking time into various parts, and linking time with one or more tasks.

In one embodiment, when planning tasks to be executed using the task planning tool 106, a geometry associated with a graphical representation of time varies, in addition to changing in a magnification level associated with the graphical representation of time. Geometry may include changing in a shape, a size, and/or a relative position of figures. For example, the display interface 108 displays a cyclic graphical representation of time which depicts a duration 12 PM to 12 AM. When the user 102 plans for a task to be executed at a duration 7 PM, the user 102 provides a gesture (e.g., a reverse-pinch gesture) on the cyclic graphical representation of time, such that the cyclic graphical representation of time may be presented as a semi-circle representation of time which includes a duration, for example 12 PM to 8 PM. Here, the cyclic graphical representation of time is transformed to the semi-circle representation of time with a higher magnification level.

Similarly, when the user 102 further provides a gesture (e.g., a reverse-pinch gesture), such that the semi-circle representation of time is presented as a flat graphical representation of time which includes a micro-fragments of time, for example 6 PM to 8 PM. The user 102 may tap at a time (e.g., 7 PM) by providing a tap gesture on the flat graphical representation of time which is displayed at the display interface 108, and plan the task for the time.

The system view 100 further includes a secondary device 110 that may act as a display device. The secondary device 110 displays content (e.g., a graphical representation of time with one or more planned tasks) at the display interface 108 of the user system 104A-N. A medium for transmitting information (e.g., the content) from the user system 104A-N to the secondary device 110 may include a short range communications such as a Bluetooth, an infrared, etc. Examples of the secondary device 110 include a watch, a table light, a wall clock, etc.

Figure 2:
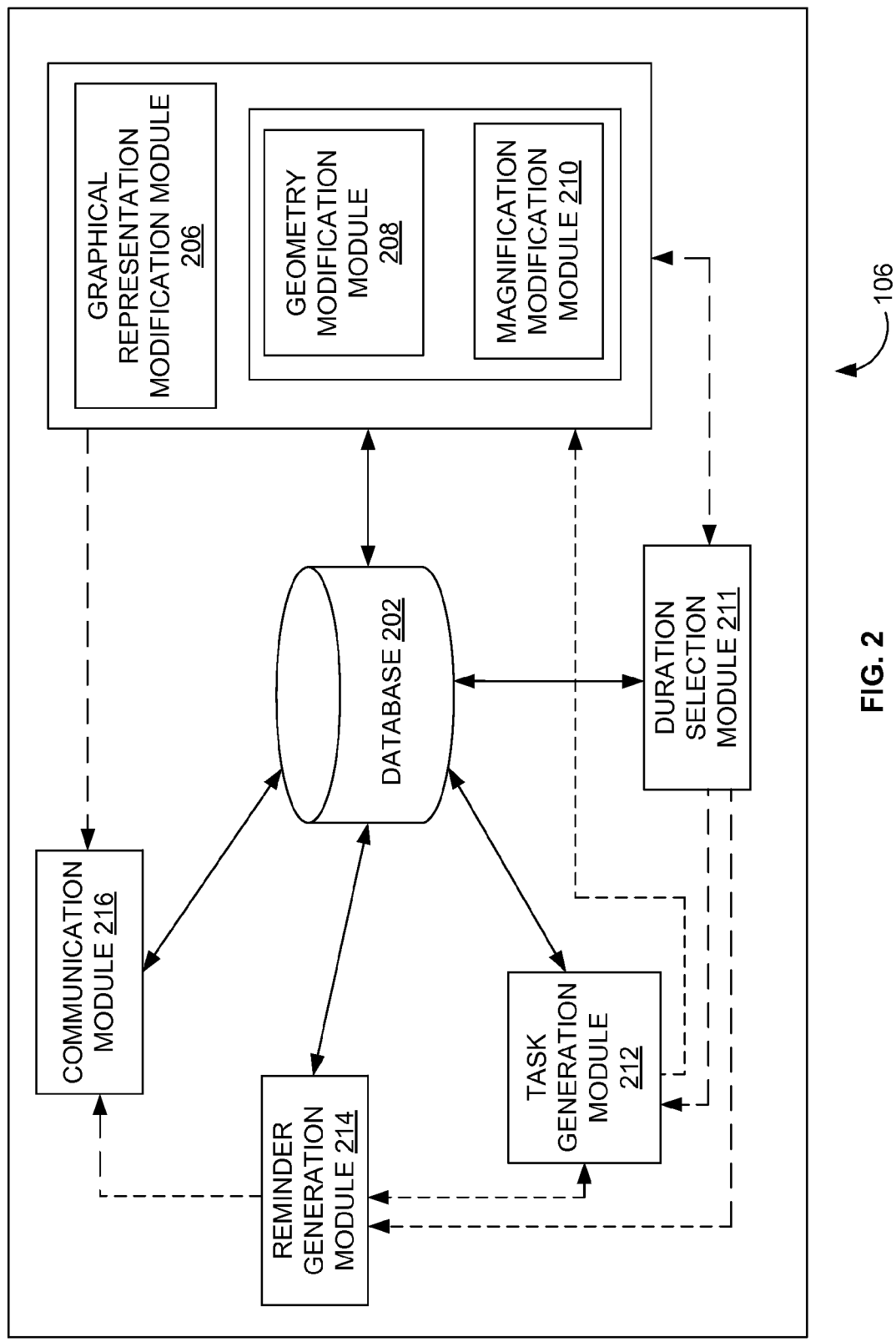
FIG. 2 illustrates an exploded view of the task planning tool of FIG. 1 according to one embodiment of the present disclosure.

FIG. 2 illustrates an exploded view of the task planning tool 106 of FIG. 1 according to one embodiment of the present disclosure. The exploded view of the task planning tool 106 includes a database 202, a graphical representation modification module 206 which includes a geometry modification module 208 and a magnification modification module 210, a duration selection module 211, a task generation module 212, a reminder generation module 214, and a communication module 216. The graphical representation modification module 206 processes a gesture on a graphical representation of time which is displayed at the display interface 108 of the user system 104A-N, and generate various graphical representation of time of different geometry and duration.

The geometry modification module 208 modifies a geometry (e.g., a shape, a size, and/or a relative position of figures) associated with a graphical representation of time based on a gesture from the user 102. The magnification modification module 210 modifies a magnification level associated with a graphical representation of time based on a gesture from the user 102. Changing the magnification level associated with a duration of the graphical representation of time leads to change in content (e.g., the duration) which is displayed at the display interface 108. A micro-fragments or a macro-fragments of time associated with the graphical representation of time is displayed at the display interface 108. The duration selection module 211 processes a gesture on a graphical representation of time and selects a duration for planning a task for the duration. The task generation module 212 processes an input, from the user 102, which includes text associated with a task, and generates the task based on the text.

The reminder generation module 214 processes an indication (e.g., a tap gesture) to select a time from a graphical representation of time, and generates a reminder for a task at the time. The communication module 216 communicates content (e.g., a graphical interface) at the display interface 108 of the user system 104A-N to the secondary device 110 of FIG. 1. The dotted lines (arrows having a dotted line property) of FIG. 2 represent internal dependencies among various modules.

Figure 3A:
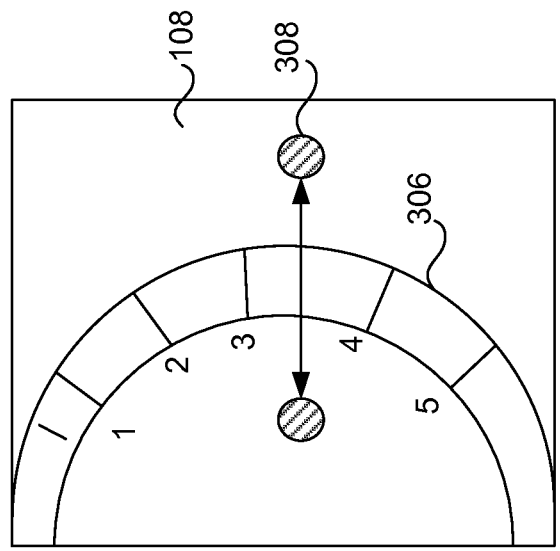
FIG. 3A is a cyclic graphical representation of time which is displayed at the display interface of the user system of FIG. 1, illustrating a gesture associated with planning one or more tasks according to one embodiment of the present disclosure.

FIG. 3A is a cyclic graphical representation of time 302 which is displayed at the display interface 108 of the user system 104A-N of FIG. 1, illustrating a gesture 304 associated with planning one or more tasks according to one embodiment of the present disclosure. For example, the cyclic graphical representation of time 302 depicts a duration 12 PM to 12 AM, as shown in the FIG. 3A. When the user 102 intends to plan for a task at a duration 1:30 PM, the user 102 performs the gesture 304 (e.g., a reverse-pinch gesture which is represented using a double headed arrow in the FIG. 3A) on the cyclic graphical representation of time 302.

Figure 3B:
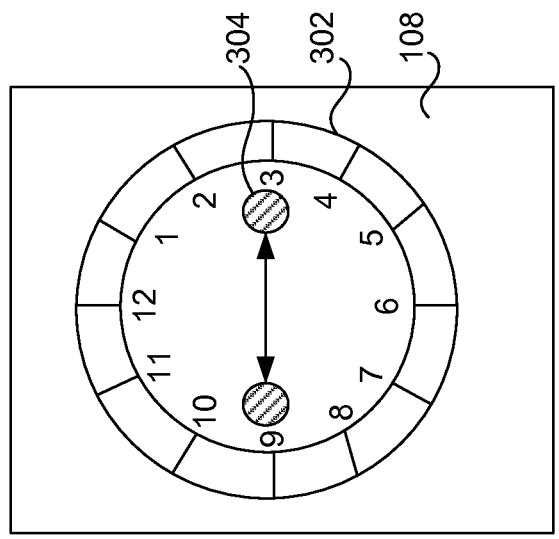
FIG. 3B is a semi-circle graphical representation of time, displayed at the interface, which is obtained by processing the gesture on the cyclic graphical representation of time using the graphical representation modification module of FIG. 2 according to one embodiment of the present disclosure.

With reference to FIG. 3A, FIG. 3B is a semi-circle graphical representation of time 306, displayed at the interface 108, which is obtained by processing the gesture 304 on the cyclic graphical representation of time 302 using the graphical representation modification module 206 of FIG. 2 according to one embodiment of the present disclosure. The geometry modification module 208 modifies a geometry (e.g., a shape) associated with the cyclic graphical representation of time 302 to the semi-circle graphical representation of time 306. The gesture 304 (e.g., a reverse-pinch gesture) stretches time associated with the cyclic graphical representation of time 302. Hence, a magnification level associated with the cyclic graphical representation of time 302 varies. The semi-circle graphical representation of time 306 represents a micro-fragments of time (e.g., 1 PM to 5 PM) which is a subset of the duration of the cyclic graphical representation of time 302.

With reference to the FIG. 3A and the FIG. 3B, FIG. 4A is an arc-shaped graphical representation of time 402, displayed at the interface 108, which is obtained by processing a gesture 308 on the semi-circle graphical representation of time 306 using the graphical representation modification module 206 of FIG. 2 according to one embodiment of the present disclosure. The geometry modification module 208 modifies a geometry (e.g., a shape) associated with the semi-circle graphical representation of time 306 into the arc-shaped graphical representation of time 402. The gesture 308 stretches time associated with the semi-circle graphical representation of time 306. Hence, a magnification level associated with the semi-circle graphical representation of time 306 varies. The arc-shaped graphical representation of time 402 represents a micro-fragments of time (e.g., 1 PM to 3 PM) which is a subset of the duration of the cyclic graphical representation of time 302 and the semi-circle graphical representation of time 306.

With reference to FIG. 3A, FIG. 3B, and FIG. 4A, FIG. 4B illustrates a flat graphical representation of time 406, displayed at the interface 108, which is obtained by processing a gesture 404 on the arc-shaped graphical representation of time 402 using the graphical representation modification module 206 of FIG. 2 according to one embodiment of the present disclosure. Based on the gesture 404 (e.g., a reverse-pinch gesture) on the arc-shaped graphical representation of time 402, an associated geometry varies to the flat graphical representation of time 406. Further, a magnification level of the arc-shaped graphical representation of time 402 varies such that a micro-fragment of time (e.g., 1 PM to 2 PM) is displayed at the flat graphical representation of time 406.

The duration selection module 211 processes a gesture (e.g., a tap gesture for selecting a duration (e.g., 1:30 PM) from the flat graphical representation of time 406), and the user may plan the task for the duration 1:30 PM. In one embodiment, the task generation module 212 processes an input (e.g., using a keyboard) from the user 102 to obtain text which correspond to the task. The user 102 can also further view fine micro-fragments of time (e.g., milliseconds) by performing a gesture 408 (e.g., a reverse-pinch gesture) on the flat graphical representation of time 406.

Similarly, when the user 102 intends to plan a task for a duration (e.g., 6 PM), the graphical representation modification module 206 processes a gesture 410 (e.g., a pinch gesture) on the flat graphical representation of time 410. A geometry associated with the flat graphical representation of time 410 modifies to the arc-shaped graphical representation of time 402. On further processing of one or more gestures (e.g., pinch gesture), the cyclic graphical representation of time 302 is displayed at the display interface 108 which includes the duration 12 PM to 12 AM. The duration selection module 211 processes a gesture (e.g., a tap gesture) from the user 102 to select a duration (e.g., 6 PM), and the user 102 may plan a task for the duration.

Similarly, by processing one or more gestures (e.g., pinch gestures), the user can view an anticipatory time associated with the duration (e.g., 12 PM to 12 AM) of the cyclic graphical representation of time 302. For example, the anticipatory time includes a week which may be represented using a spiral representation of time. The spiral representation of time may have 7 spirals, and each spiral may represent each day of the week. In one embodiment, the duration of the cyclic graphical representation of time 302 is a subset of the anticipatory time.

FIG. 5 illustrates gestures 502 and 504 for manipulating time associated with a graphical representation of time 506 which is displayed at the display interface 108 of FIG. 1 according to one embodiment of the present disclosure. For instance, the graphical representation of time 506 is a disc shaped graphical representation of time. In one embodiment, only a part of the disc shaped graphical representation of time 506 is displayed to the user 102 at the display interface 108. The task planning tool 106 processes the gesture 502 (e.g., represented using an arc shaped double headed arrow) from the user 102, and allows the user 102 to rotate the disc such that a new set of duration is displayed to the user 102 at the display interface 108. For example, a duration associated with a part of the disc shaped graphical representation of time 506 is 1 PM to 3 PM, as shown in the FIG. 5. When the user 102 performs the gesture 502, the task planning tool 106 processes the gesture 502 such that the disc is rotated, and a new set of duration (e.g., 2 PM to 4 PM) is displayed at the display interface 108.

In another embodiment, the graphical representation modification module 206 processes the gesture 504 (e.g., a reverse-pinch gesture) from the user 102, and the task planning tool 106 varies a geometry, and a magnification level of the disc shaped graphical representation of time 506 as described above.

FIG. 6A illustrates an example graphical representation of time (a circular representation of time 602) depicting a whole day, displayed at the display interface 108 of the user system 104A-N of FIG. 1, according to one embodiment of the present disclosure. The user 102 can plan one or more tasks to be executed on the day using the circular representation of time 602. The circular representation of time 602 may depict an inner circle 604 and an outer circle 606. The inner circle 604 may represent a daytime (e.g., 6 AM to 6 PM), and the outer circle 606 may represent a nighttime (e.g., 6 PM to 6 AM). The graphical representation modification module 206 processes user input (e.g., a gesture) to stretch, compress, expand, and/or fragment time of the circular representation of time 602, and manipulate a magnification level associated with the circular representation of time 602. In one embodiment, micro-fragments of time depicting a subset of time associated with the circular representation of time 602 is displayed at the display interface 108. In another embodiment, a macro-fragments of time depicting an anticipatory time associated with the circular representation of time 602 is displayed. In one embodiment, a geometry associated with the circular representation of time 602 varies to a spiral, a flat, an arc, or a table representation of time.

FIG. 6B illustrates another example graphical representation of time (a spiral representation of time 608) depicting a whole day, displayed at the display interface 108 of the user system 104A-N of FIG. 1, according to one embodiment of the present disclosure. The spiral representation of time 608 may include a first spiral 610 depicting a daytime (e.g., 6 AM to 6 PM), and a second spiral 612 depicting a nighttime (e.g., 6 PM to 6 AM). The graphical representation modification module 206 processes a gesture from the user 102, and modifies a magnification level associated with the spiral representation of time. Modifying the magnification level displays a micro-fragments of time or a macro-fragments of time associated with the spiral representation of time 608.

For example, when the user 102 performs a gesture (e.g., a reverse-pinch gesture) for manipulating duration on the first spiral 610, a micro-fragments of time including a subset of duration (e.g., 6 AM to 9 AM) is displayed at the display interface 108. In one embodiment, the user 102 may select a duration from the micro-fragments of time, and plan a task for the duration. In another embodiment, the user 102 may perform another gesture to further zoom in the micro-fragments of time, and may plan a task. Similarly, the user 102 may perform one or more gestures for manipulating duration on the second spiral 612, and plan a task for a duration (e.g., 8 PM).

The task planning tool 106 also provides a graphical representation of time which includes an anticipatory time associated with the duration of the spiral representation of time 608 by processing a gesture (e.g., a pinch gesture) on the spiral representation of time 608. For example, the spiral representation of time 608 depicting a whole day (e.g., Jul. 20, 2013). On processing the gesture (e.g., a pinch gesture) on the spiral representation of time 608, a geometry, and a magnification level associated with the spiral representation of time 608 varies, such that a graphical representation of time which includes a macro-fragments of time depicting an anticipatory time (e.g., a week from Jul. 14, 2013 to Jul. 21, 2013) may be displayed at the display interface 108. The week may be represented using a spiral graphical representation of time which may include 7 spirals, and each spiral may represent a day.

The task planning tool 106 generates graphical representation of time of various geometrical shapes upon processing gestures from the user 102. The geometrical shapes is not limited only to a cyclic graphical representation, a semi-circle graphical representation, an arc shaped graphical representation, a flat shaped graphical representation, a disc shaped graphical representation, a circular representation, and a spiral representation, which are described above. Other examples of geometrical shapes include a table representation, a curve representation, etc. For example, upon processing a gesture from the user 102, a cyclic representation of time may be presented as a table representation of time.

FIG. 7 illustrates blocking a duration associated with a graphical representation of time for a task using a handle bar 702 which is displayed at the display interface 108 of FIG. 1 according to one embodiment of the present disclosure. For example, the graphical representation of time is an arc shaped graphical representation of time 704. The user 102 can block a duration for a task by providing a gesture (e.g., a rotate gesture which is indicated using an arrow in the FIG. 7) to rotate the handle bar 702. For example, when the user 102 intends to plan for a task at a duration between 1:12 PM to 1:45 PM. The duration selection module 211 processes a gesture (e.g., a rotate gesture) includes rotating the handle bar 702 between the duration 1:12 PM to 1:45 PM, and blocks the duration for the task. In one embodiment, the user 102 can use object such as his/her finger instead of the handle bar 702 to block the duration for the task. Also, the handle bar 702 assists the user 102 in adjusting time associated with the graphical representation of time at a micro-level.

Figure 8:
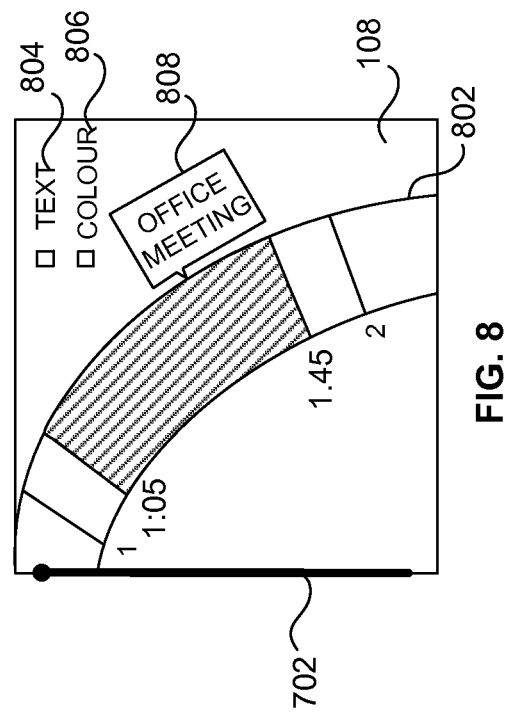
FIG. 8 illustrates planning a task with the task planning tool based on a graphical representation of time, and assigning a color to the task according to one embodiment of the present disclosure.

FIG. 8 illustrates planning a task with the task planning tool 106 based on a graphical representation of time, and assigning a color to the task according to one embodiment of the present disclosure. For example, the graphical representation of time is an arc-shaped graphical representation of time 802 which depicts a duration (e.g., 1 PM to 2 PM). The user 102 blocks a duration from the arc-shaped graphical representation of time 802 for a task using the handle bar 702, or using an object such as his/her finger, and may select a text field 804 to input content related to the task. Examples of selecting the text field 804 may include inputting a tick mark in a square block which is adjacent to the text field 804. In one embodiment, when the user 102 selects the text field 804, a graphical user interface (e.g., a rectangular block 808) is displayed at the display interface 108. The graphical user interface may be provided over the duration associated with the task. The user 102 provides an input including content (e.g., "Office meeting") in the graphical user interface, and the task generation module 212 processes the content and store it.

The user 102 may also select a color field 806, and assigns a color to the task. Assigning a color to a task may include making a portion of the graphical representation of time associated with a duration of the task as colorful. In one embodiment, when the user 102 selects the color field 806, a menu of various colors may be displayed to the user 102. The user 102 may select a color from the menu, and assigns a color for the task. For example, when the user 102 selects a white color from the menu for the task "office meeting", a portion of the arc-shaped graphical representation of time 802 associated with the duration 1:05 PM to 1:45 PM of the task is assigned with white color.

Figure 9:
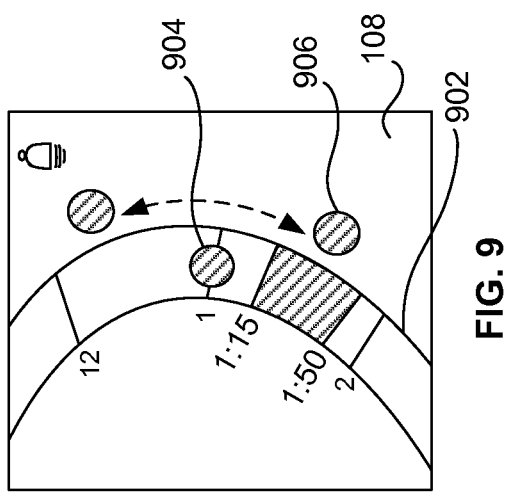
FIG. 9 illustrates setting one or more reminders for a task with the task planning tool based on a graphical representation of time according to one embodiment of the present disclosure.

FIG. 9 illustrates setting one or more reminders for a task with the task planning tool 106 based on a graphical representation of time according to one embodiment of the present disclosure. For example, the graphical representation of time is a disc-shaped graphical representation of time 902 which depicts a duration (e.g., 11 AM to 6 PM). The user 102 can set one or more reminders for a task by providing one or more gestures (e.g., a tap gesture 904, and/or a rotate gesture 906). The user 102 may provide the tap gesture 904 on the disc-shaped graphical representation of time 902 to select a time, and the reminder generation module 214 processes the tap gesture 904 and set a reminder for a task at the time.

The user 102 may also provide the rotate gesture 906 (represented using a double headed arrow in the FIG. 9), such that the disc is rotated to depict a new set of duration. The user 102 may select another time from the new set of duration, and a second reminder is set to generate at the time. For example, when the user 102 intends to set reminders for a task that has already planned for a duration 1:15 PM to 1:50 PM. The user may provide the tap gesture 904 on the disc shaped graphical representation of time 902 to select a time (e.g., 11.15 AM, not shown in the FIG. 9). The reminder generation module 214 processes the tap gesture 904, and generates a first reminder for the task at 11.15 AM. The user 102 may also provide a rotate gesture 906, and the disc is rotated such that a new duration (e.g., 12 PM to 2 PM) is displayed at the display interface 108. The user may provide the tap gesture 904 and selects another time (e.g., 1 PM), and a second reminder is set for the task at 1 PM. Similarly, the user 102 can set various reminders for a task based on a graphical representation of time in an intuitive manner. In one embodiment, the reminder generation module 214 processes a user input including content associated with a reminder. In one embodiment, the content itself is displayed as the reminder.

In one embodiment, a geometry and/or a magnification level associated with a graphical representation of time 902 varies when setting one or more reminders for a task. For example, the user 102 may set a first reminder for a task based on a first graphical representation of time (e.g., the disc shaped graphical representation of time 902) of a magnification level. On processing a gesture (e.g., a pinch gesture to zoom-out, or a reverse-pinch gesture to zoom-in) on the first graphical representation of time, a second graphical representation of time (e.g., a spiral graphical representation of time) is presented at the display interface 108. The user 102 may set a second reminder for the task based on the second graphical representation of time of a different magnification level.

Figure 10:
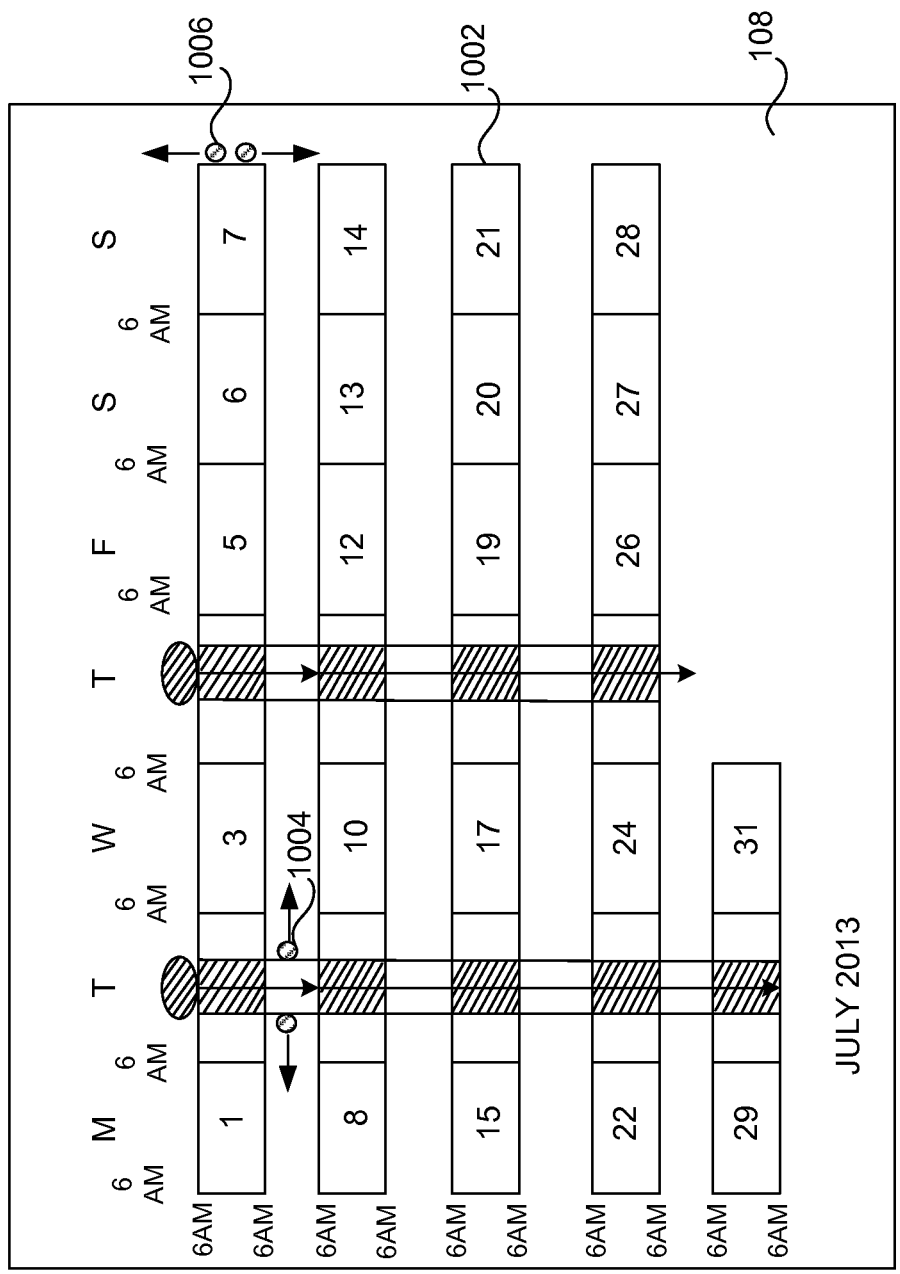
FIG. 10 is a graphical representation of time illustrating planning one or more repeating tasks for a duration using the task planning tool according to one embodiment of the present disclosure.

FIG. 10 is a graphical representation of time illustrating planning one or more repeating tasks for a duration using the task planning tool 106 according to one embodiment of the present disclosure. For example, the graphical representation of time is a table graphical representation of time 1002 depicting a month (e.g., July 2013). A horizontal axis and a vertical axis of the table graphical representation of time 1002 may depict a time scale of 24 hours (e.g., 6 AM to 6 AM). The user 102 can plan a task that is repeating at a frequency of a week by performing one or more gestures (e.g., a horizontal reverse-pinch gesture 1004, and/or a tap gesture) on the table graphical representation of time 1002. For example, the user 102 intends to plan a task (e.g., attending a music class on every Tuesday at 7:00 AM for a month). The user 102 may provide the horizontal reverse-pinch gesture 1004 as shown in the FIG. 10, such that duration associated with the time scale stretched or zoomed-in to display a micro-fragments of time (e.g., 6 AM to 9 AM). The user 102, then selects the time 7:00 AM, and the duration selection module 211 processes a gesture from the user 102 including dragging vertically on the table graphical representation of time 1002 to block the time (e.g., 7:00 AM) for all Tuesday of the month July 2013 for the task.

Similarly, the user 102 can plan a task that is repeating on a consecutive days by performing one or more gestures (e.g., a vertical reverse-pinch gesture 1006, and/or a tap gesture) on the table graphical representation of time 1002. For example, the user 102 intends to plan a task (e.g., attending a music class for a week at 7:00 AM). The user 102 may provide the vertical reverse-pinch gesture 1006 as shown in the FIG. 10, such that duration associated with the time scale stretched or zoomed-in to display a micro-fragments of time (e.g., 6 AM to 9 AM). The user 102, then selects the time 7:00 AM, and the duration selection module 211 processes a gesture from the user 102 including dragging horizontally on the table graphical representation of time 1002 to block the time (e.g., 7:00 AM) for a week for the task. The FIG. 10 is an example for planning a task that is repeating at a frequency of a week, and consecutive days. However, similarly, a person of ordinary skill in the art can implement the embodiment for planning a task that is repeating at a frequency of any duration (e.g., a month, and a year) using such graphical representation of time.

Figure 11:
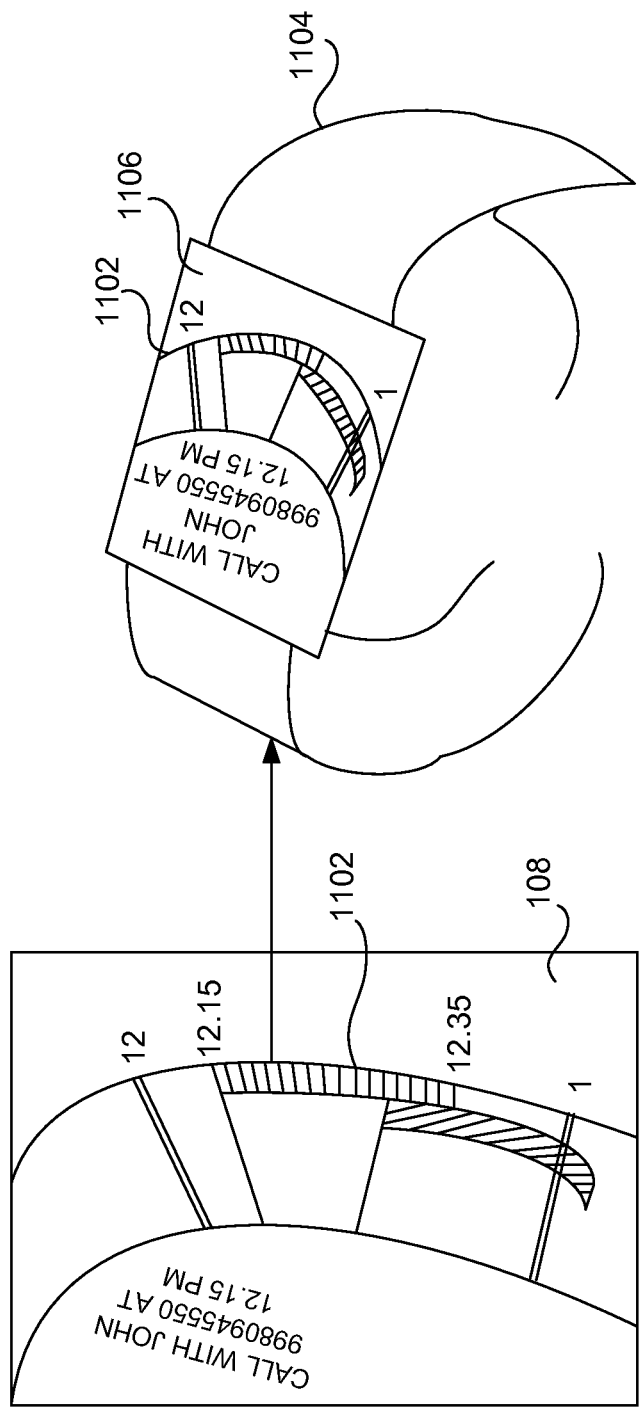
FIG. 11 illustrates communicating content at the display interface of the user system to a secondary display device using the communication module of FIG. 2 according to one embodiment of the present disclosure.

FIG. 11 illustrates communicating content 1102 at the display interface 108 of the user system 104A-N to a secondary display device 1104 using the communication module 216 of FIG. 2 according to one embodiment of the present disclosure. As described, a medium of transmitting the content 1102 from the user system 104A-N to the secondary display device 1104 may include a short range communications such as a Bluetooth, an infrared, etc. An example application of communicating content to the secondary display device 1104 may include, a user has already planned a task (e.g., call with John 9980945550) for a duration (e.g., 12.15 PM to 12.35 PM) using the user system 104A-N (e.g., a smart phone). A reminder associated with the task has set, for example at 12.00 PM. The user 102, who may be at a conference or a meeting, need not use the smart phone to check the reminder (i.e., content 1102 which is displayed at the display interface 108), and he/she may use the secondary display device 1104, may be a wrist watch for the purpose. The reminder is displayed at a display unit 1106 of the secondary display device 1104.

Figure 12:
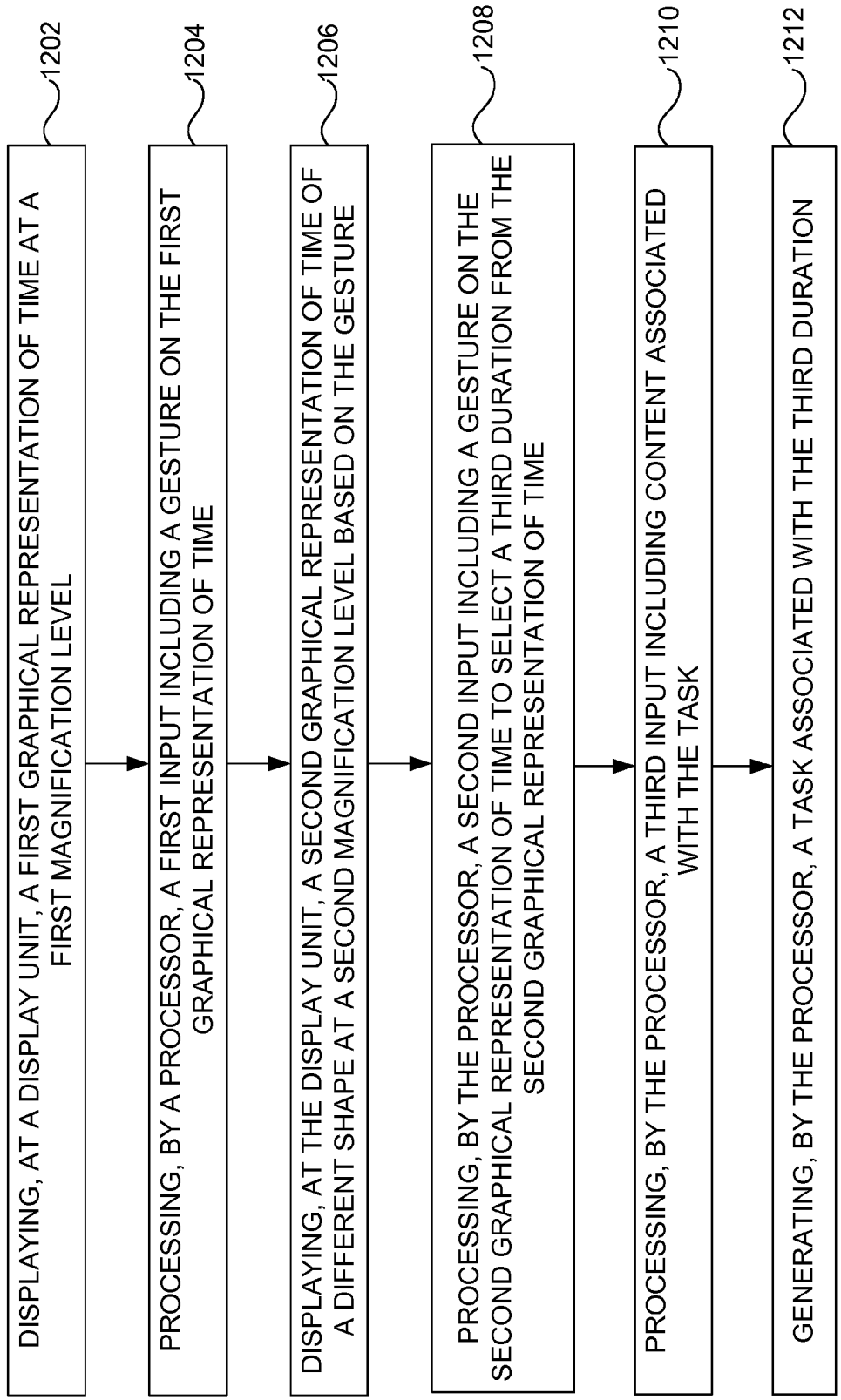
FIG. 12 is a flow diagram illustrating a method for planning a task based on a graphical representation of time using the task planning tool of FIG. 1 according to one embodiment of the present disclosure.

FIG. 12 is a flow diagram illustrating a method for planning a task based on a graphical representation of time using the task planning tool 106 of FIG. 1 according to one embodiment of the present disclosure. In step 1202, a first graphical representation of time at a first magnification level is displayed at a display unit. The first graphical representation of time represents a first duration. In step 1204, a processor processes a first input including a gesture on the first graphical representation of time. In step 1206, a second graphical representation of time of a different shape at a second magnification level is displayed, at the display unit, based on the gesture. The second graphical representation of time represents a second duration. In one embodiment, the second duration is obtained by the gesture on the first graphical representation of time is a reverse-pinch gesture for zooming in the first duration. A magnification level of the first duration varies to obtain the second duration. The second duration is a subset of the first duration. In another embodiment, the second duration is obtained by the gesture on the first graphical representation of time is a pinch gesture for zooming out the first duration. A magnification level of the first duration varies such that an anticipatory time associated with the first duration is displayed as the second duration. Thus, the first duration is a subset of the second duration.

In step 1208, a second input including a gesture on the second graphical representation of time to select a third duration from the second graphical representation of time is processed by the processor. In step 1210, a third input including content associated with the task is processed by the processor. In step 1212, the task associated with the third duration is generated by the processor. The method may further include processing a fourth input including an indication to select a time associated with the task from the second graphical representation of time, and generating a reminder for the task at the time.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
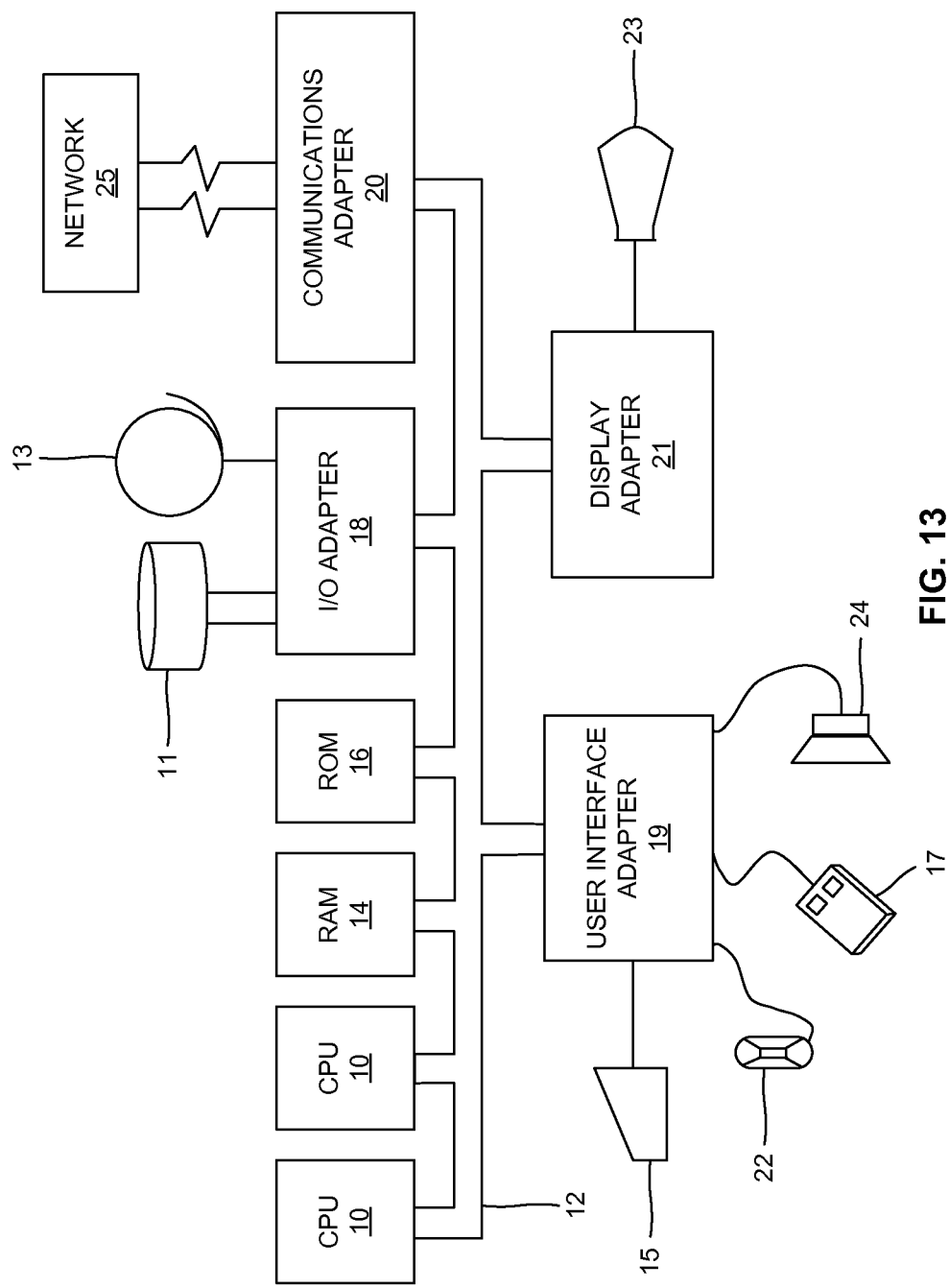
FIG. 13 illustrates a schematic diagram of a computer architecture according to one embodiment of the present disclosure.

A representative hardware environment for practicing the embodiments herein is depicted in FIG. 13. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The task planning tool 106 allows the user 102 to plan a task in a less time and in an intuitive manner at reduced human efforts. When the user 102 manipulates time associated with a graphical representation of time, micro-fragments or macro-fragments of time are displayed. The user 102 selects a duration associated with a task from the graphical representation of time, and plans the task with less effort. With modifying geometry of the graphical representation of time, the task planning tool 106 allows the user 102 to navigate between (i) a user interface for planning a macro-task that takes more time (e.g., few hours) to complete, and (ii) a user interface for planning a micro-task that takes less time (e.g., few seconds, or few minutes) to complete easily. Otherwise, the user 102 has to do multiple scrolls to navigate between user interfaces for planning a micro-task and a macro-task. Thus, the task planning tool 106 reduces human efforts and time taken to arrive at a desired user interface for planning a task.

The user may find convenient planning a first task (e.g., attending a sports event at 3 PM) based on a cyclic representation of time, and planning a second task (e.g., attending a music class for a week at 7:00 AM) based on a table representation of time. By modifying the geometry of the cyclic representation to the table representation, the user need not to navigate each day of the week and blocks 7:00 AM for the task. By a simple gesture on the table graphical representation of time, the user 102 can block the time for the task for the week. The task planning tool 106 processes one or more gestures from the user 102, and provides various geometries for planning one or more tasks. Setting a reminder for a task can be performed by providing a simple gesture (e.g., a tap gesture) on a duration for which the reminder has to set.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method for planning a task based on a graphical representation of time, said method comprising:
  displaying a spiral representation of time at a first magnification level, wherein said spiral representation of time comprises seven spirals, wherein each spiral represents a day of a week;
  processing a first reverse-pinch gesture on said spiral representation of time to select a first spiral that corresponds to a first day of said week;
  displaying a cyclic graphical representation of time at a second magnification level, wherein said cyclic graphical representation of time represents a duration associated with said first day of said week;
  processing a second reverse-pinch gesture on said cyclic graphical representation of time;
  displaying an arc-shaped graphical representation of time at a third magnification level based on said second reverse-pinch gesture, wherein said arc-shaped graphical representation of time represents a first duration that is a subset of said duration associated with said first day of said week;
  associating a first task with said first duration associated with said arc-shaped graphical representation of time, wherein said first duration is greater than one hour;
  processing a first rotate gesture on said first duration to obtain a second duration associated with said arc-shaped graphical representation of time;
  processing a third reverse-pinch gesture on said second duration associated with said arc-shaped graphical representation of time;
  displaying a flat graphical representation of time at a fourth magnification level based on said third reverse-pinch gesture, wherein said flat graphical representation of time represents a third duration that is a subset of said second duration;
  associating a second task with said third duration associated with said flat graphical representation of time, wherein said third duration is less than one hour;
  processing (i) at least one pinch gestures on said flat graphical representation of time to obtain said spiral representation of time, and (ii) a fourth reverse-pinch gesture on said spiral representation of time to select a second spiral that corresponds to a second day of said week to plan a third task associated with said second day of said week;
  processing a vertical reverse-pinch gesture on a graphical representation of time that comprises a table; and
  blocking a time for a duration for a repeating task based on said vertical reverse-pinch gesture on said graphical representation of time that comprises said table.

2. The method of claim 1, wherein said first reverse-pinch gesture magnifying said spiral representation of time to obtain said cyclic graphical representation of time, wherein said second reverse-pinch gesture magnifying said cyclic graphical representation of time that represents said duration of said first day of said week to obtain said arc-shaped graphical representation of time that represents said first duration, wherein said third reverse-pinch gesture magnifying said arc-shaped graphical representation of time that represents said second duration to obtain said flat graphical representation of time.

3. The method of claim 1, further comprising
  processing a first tap gesture to select said first duration associated with said first task from said arc-shaped graphical representation of time;
  associating a first reminder for said first duration associated with said first task;
  processing (a) a second rotate gesture to select said second duration from said arc-shaped graphical representation of time, (b) a second tap gesture to select said third duration associated with said second task, wherein said third duration is subset of said second duration;
  associating a second reminder for said third duration associated with said second task;
  displaying a plurality of colors when a color field is selected; and
  assigning a different color to each of (i) said first task, and (ii) said second task when selecting said color from said color field.

4. The method of claim 1, further comprising planning a repeating task for a duration comprising:
  processing a horizontal reverse-pinch gesture on a graphical representation of time that comprises a table;
  displaying a duration associated with said graphical representation of time; and
  associating said repeating task with said duration by blocking said duration associated with said graphical representation of time.

5. The method of claim 4, wherein said graphical representation of time that comprises said table is stretched or compressed to display said duration associated with said graphical representation of time based on said horizontal reverse-pinch gesture.

6. A system for planning a task based on a graphical representation of time comprising:
  (a) a memory that stores (i) a set of modules, and (ii) a database;
  (b) a display that displays a spiral representation of time at a first magnification level, wherein said spiral representation of time comprises seven spirals, wherein each spiral represents a day of a week;
  (c) a processor that executes said set of modules, wherein said set of modules comprise:
    (i) a graphical representation modification module, executed by said processor,
  processes (a) a first reverse-pinch gesture on said spiral representation of time to obtain a cyclic graphical representation of time at a second magnification level, wherein said cyclic graphical representation of time comprises a duration associated with a first day of said week associated with a first spiral represented by said spiral representation of time, (b) a second reverse-pinch gesture on said cyclic graphical representation of time to obtain an arc-shaped graphical representation of time at a third magnification level, wherein said arc-shaped graphical representation of time represents a first duration that is a subset of said duration associated with said first day of said week, (c) a first rotate gesture on said first duration to obtain a second duration associated with said arc-shaped graphical representation of time, and (d) a third reverse-pinch gesture on said second duration associated with said arc-shaped graphical representation of time to obtain a flat graphical representation of time at a fourth magnification level, wherein said flat graphical representation of time represents a third duration that is a subset of said second duration, wherein said graphical representation modification module comprises:
    (a) a magnification modification module, executed by said processor, that alters (a) said first magnification level of said spiral representation of time to said second magnification level, (b) said second magnification level of said cyclic graphical representation of time to said third magnification level, and (c) said third magnification level of said arc-shaped graphical representation of time to said fourth magnification level, and (b) a geometry modification module, executed by said processor, that alters a shape of (i) said spiral representation of time to obtain said cyclic graphical representation of time, (ii) said cyclic graphical representation of time to obtain said arc-shaped graphical representation of time, and (iii) said arc-shaped graphical representation of time to obtain said flat graphical representation of time, and (ii) a duration selection module, executed by said processor, that processes a vertical reverse-pinch gesture on a graphical representation of time that comprises a table;

(iii) a task generation module, executed by said processor, that (a) associates (i) a first task with said first duration associated with said arc-shaped graphical representation of time, wherein said first duration is greater than one hour, and (ii) a second task with said third duration associated with said flat graphical representation of time, wherein said third duration is less than one hour, and (b) blocks a time for a said duration for a repeating task based on said vertical reverse-pinch gesture on said graphical representation of time that comprises said table; and (iv) a reminder generation module, executed by said processor, that (a) process (i) a first tap gesture to select said first duration associated with said first task from said arc-shaped graphical representation of time, and (ii) a second tap gesture to select said third duration associated with said second task, and (b) associating (i) a first reminder for said first duration associated with said first task, and (ii) a second reminder for said third duration associated with said second task, wherein said graphical representation modification module further processes (i) at least one pinch gestures on said flat graphical representation of time to obtain said spiral representation of time, and (ii) a fourth reverse-pinch gesture on said spiral representation of time to select a second spiral that corresponds to a second day of said week to plan a third task associated with said second day of said week.

7. The system of claim 6, wherein said first reverse-pinch gesture magnifying said spiral representation of time to obtain said cyclic graphical representation of time, wherein said second reverse-pinch gesture magnifying said cyclic graphical representation of time that represents said duration of said first day of said week to obtain said arc-shaped graphical representation of time that represents said first duration, wherein said second duration is subset of said first duration, and wherein said third reverse-pinch gesture magnifying said arc-shaped graphical representation of time that represents said first duration to obtain said flat graphical representation of time.

8. A method for planning a task based on a graphical representation of time, said method comprising:

displaying a spiral representation of time at a first magnification level, wherein said spiral representation of time comprises seven spirals, wherein each spiral represents a day of a week;

processing a first reverse-pinch gesture on said spiral representation of time to select a first spiral that corresponds to a first day of said week;

displaying a cyclic graphical representation of time at a second magnification level, wherein said cyclic graphical representation of time represents a duration associated with said first day of said week;

processing a second reverse pinch gesture on said cyclic graphical representation of time;

displaying an arc-shaped graphical representation of time at a third magnification level based on said second reverse pinch gesture, wherein said arc-shaped graphical representation of time represents a first duration that is a subset of said duration associated with said first day of said week;

associating a first task with said first duration associated with said arc-shaped graphical representation of time, wherein said first duration is greater than one hour;

processing a first rotate gesture on said first duration to obtain a second duration associated said arc-shaped graphical representation of time;

processing a third reverse-pinch gesture on said second duration associated with said arc-shaped graphical representation of time;

displaying a flat graphical representation of time at a fourth magnification level based on said third reverse-pinch gesture, wherein said flat graphical representation of time represents a third duration that is a subset of said second duration;

associating a second task with said third duration associated with said flat graphical representation of time, wherein said third duration is less than one hour;

processing (i) a plurality of pinch gestures on said flat graphical representation of time to obtain said spiral representation of time, and (ii) a fourth reverse-pinch gesture on said spiral representation of time to select a second spiral that corresponds to a second day of said week to plan a third task associated with said second day of said week;

processing a vertical reverse-pinch gesture on a graphical representation of time that comprises a table;

blocking a time for a duration for a repeating task based on said vertical reverse-pinch gesture on said graphical representation of time that comprises said table; and associating (i) a first reminder for said first duration associated with said first task, and (ii) a second reminder for said third duration associated with said second task.

9. The method of claim 8, wherein said method further comprises (i) displaying a plurality of colors when a color field is selected; and (ii) assigning a different color to each of (i) said first task, and (ii) said second task when selecting said color from said color field.

10. The method of claim 8, further comprising planning a repeating task for a duration comprising:

processing a horizontal reverse-pinch gesture on a graphical representation of time that comprises a table;

displaying a duration associated with said graphical representation of time; and associating said repeating task with said duration by blocking said duration associated with said graphical representation of time, wherein said graphical representation of time comprises said table that is stretched or compressed to display said duration associated with said graphical representation of time based on said horizontal reverse-pinch gesture.

* * * * *